Figure 1:
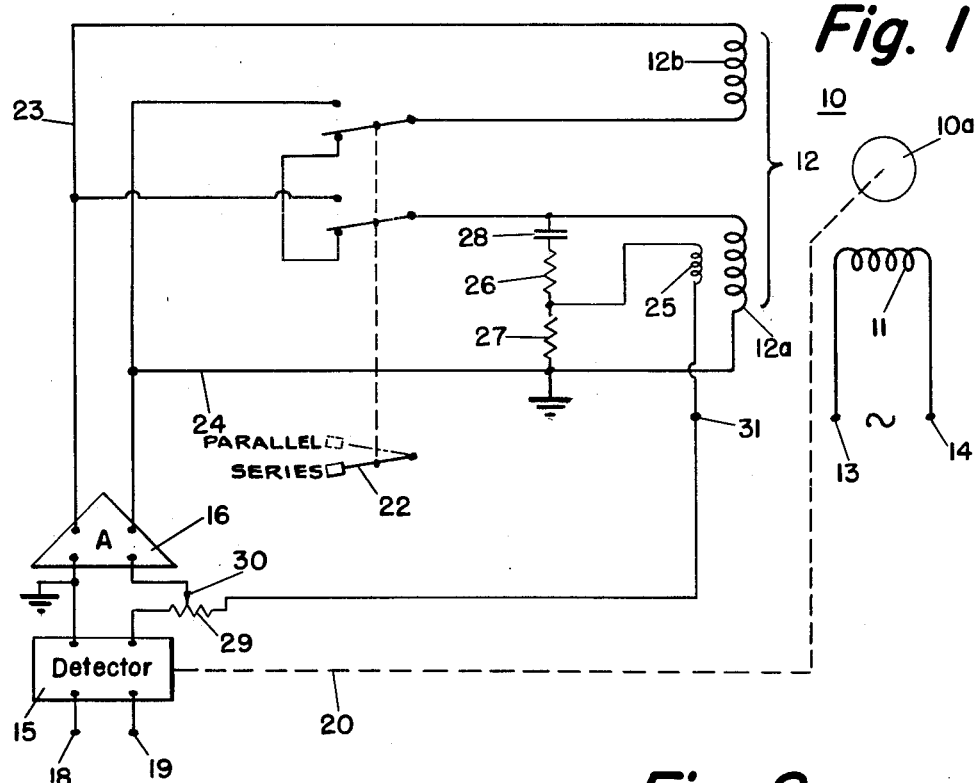

United States Patent Office 2,993,160
Patented July 18, 1961

2,993,160
SERVO-MOTOR WITH BUILT-IN TAC-GENERATOR
AND SYSTEM
Sven Gunnar Söredal, Stockholm, Sweden, assignor to Svenska Ackumulator Aktiebolaget Jungner, Stockholm, Sweden, a company of Sweden
Filed Feb. 5, 1959, Ser. No. 791,409
Claims priority, application Sweden Feb. 5, 1958
8 Claims. (Cl. 318—448)

This invention relates to induction motors of the squirrel cage or short-circuited rotor type, particularly useful as servo-motors, and has for an object the provision of a two-phase induction motor from which there is derived a feedback voltage of amplitude varying in accordance with speed of rotation of the motor.

Induction motors of the two-phase type and having rotors of the short-circuited or squirrel cage type are in use as the driving elements in servo-systems. In such systems, it is frequently desirable to damp the rotation of the servo-motor and to prevent it from swinging around or about a position where its torque should normally be zero. In the past, tachometer generators have been used to provide a damping action on the rotor. Such tachometer generators have been mechanically coupled to the servo-motor. The generated potential from the tachometer generator, having the same frequency as the feed potential but with a magnitude dependent upon the speed of revolution of the generator, is subtracted from the output potential of a sensing device. The resultant potential difference is applied to the input of an amplifier which supplies the energization for the control winding of the servo-motor. In this manner, the aforesaid damping action is provided. Those skilled in the art understand that tachometer generators for the described application need not be as exact as a generator intended for precise measurement of speed of rotation, though it is understood that such tachometer generators are available and classified according to the accuracy or precision with which the output voltage corresponds with the speed of rotation. While tachometer generators have been satisfactory to provide the damping of a servo-system, they are in size about the same as the servo-motors to which they are coupled. This is, of course, a drawback not only from the additional cost, but also as adding unnecessary weight. For applications in airplanes, missiles, etc., both space and weight are at a premium, and it is, therefore, important that the weight of the servo-systems be kept at a minimum.

It is an object of the present invention to provide a servo-motor with an additional winding from which there may be derived a damping voltage.

It is a further object of the invention to incorporate into the servo-motor itself an additional or auxiliary winding which with a nominal increase in size and weight of the motor, provides a damping voltage for the servo-system with which the motor is utilized.

It is a further object of the invention to provide a servo-motor together with an auxiliary or additional winding to provide a damping voltage without materially increasing the cost of the servo-motor in the absence of the additional winding.

In accordance with the present invention, the motor mainly consists of a rotor and a stator with windings for two phases, and in addition an axtra winding electrically in parallel with at least a part of one of the windings of one of the phases. The invention is further characterized by the fact that the extra winding is connected to one of the phase windings by means of a voltage-modifying and phase-correcting circuit.

In a preferred embodiment of the invention, the coupling circuit of the network includes a potential divider which, through suitable impedance elements which may include capacitors or inductors and resistors, is coupled to one of the motor windings.

In accordance with the present invention, the driving means forming a part of a servo-system combines in a single machine the functions of the servo-motor and the tachometer generator. That machine need be but slightly larger than a servo-motor of the conventional type and of the same rating. The increase in cost is negligible over the cost of a servo-motor of conventional design. Therefore, the invention in savings alone implies an important technical and economical advance. This result is achieved by disposing within the same winding slots, or in the same electrical and magnetic positions in the stator, an auxiliary winding and which through the coupling network provides an output which to a close approximation is proportional to the speed of rotation of the rotor. The output from the auxiliary or tachometer winding is then introduced into the input of the amplifier in opposition to the output potential from a conventional detector, thereby to provide damping of the servo-motor. The coupling network additionally functions to eliminate oscillation or hunting of the motor about the balance point.

Figure 2:
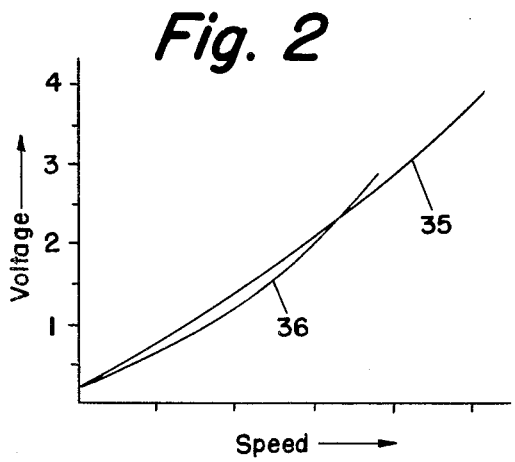
Figure 3:
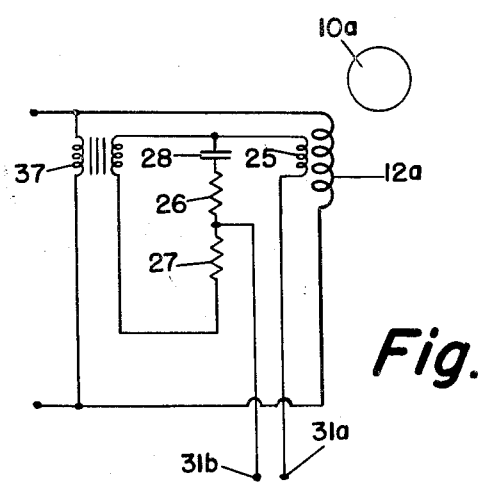

For further objects and advantages of the invention, reference is to be had to the following detailed description taken in conjunction with the accompanying drawings, in which:

FIG. 1 diagrammatically illustrates one embodiment of the invention;

FIG. 2 is a graph showing the relationship between the output potential from the tachometer winding as a function of the speed of rotation of the servo-motor; and FIG. 3 diagrammatically illustrates a modification of a part of the arrangement of FIG. 1.

Referring now to FIG. 1, a servo-motor 10 includes a rotor 10a, a power winding 11, and a control winding 12 which includes two coils 12a and 12b. The power or reference winding 11 forming one phase of the two-phase induction motor 10 is arranged ninety electrical degrees in space from the coils 12a and 12b of control winding 12. The power winding 11, through supply terminals 13 and 14, is energized from a suitable source of alternating-current supply. The control winding 12 is energized under the control of an amplifier 16 having an alternating-current source of supply for its output circuit of the same frequency as the source for the power winding 11. The amplifier 16 under the control of a detector 15 energizes the control winding 12 with alternating current of an amplitude dependent upon the magnitude of a potential difference between an input signal applied to input terminals 18 and 19 and a balancing signal, the magnitude of which is varied with rotation of rotor 10a. Thus the balancing signal may be derived from a potentiometer circuit including a slidewire or a synchro viz. a control transformer driven by rotor 10a as by the mechanical connection 20. With a control switch 22 in the illustrated position, it will be noted that the coils 12a and 12b are connected in series with the output circuit including conductors 23 and 24 from the amplifier 16. The coils 12a and 12b may be connected in parallel as impedance matching for the amplifier 16 may require.

Assuming now that an input signal is applied to terminals 18 and 19, it will be understood by those skilled in the art that a difference signal, as a potential difference, will be applied to the input of amplifier 16 which will be of one phase with the difference of one sign, and of the opposite phase with the difference of opposite sign.

In accordance with the present invention, an additional winding 25 is provided in the stator in the same space with at least a part of winding 12. It may be disposed within the same slots, particularly in the same electrical and mechanical relationship as a part of winding 12. The additional or tachometer winding 25 has one end thereof electrically connected to a coupling network which includes a potential divider formed by resistors 26 and 27, that network also including an additional impedance element shown as a capacitor 28. The other end of tachometer winding 25 is connected to the input of the amplifier 16 in a manner to oppose the output voltage from detector 15. As illustrated, this connection has been made by way of coupling resistor 29 having an adjustable tap 30. Since it is desired to introduce a damping voltage into the input of amplifier 16, with low current drain, the tachometer winding 25 may have a high resistance, and it need only occupy a few percent of the available space of the stator grooves occupied by the control winding 12. The potential divider 26—28 may likewise have a high effective resistance, and the capacitor 28 may be small, that is, with a small capacitance. Thus, the coupling network occupies but a small space and leads to its inclusion in a small control box mounted directly on the servo-motor. It may even be included in the terminal box provided for such motors.

The proportioning of the impedance elements in the coupling network will be understood by the following considerations.

If it be assumed that an alternating current is applied to the coil 12a and within the same slots in which tachometer winding 25 is disposed, it will be seen that coil 12a will act as the primary winding of a transformer and thus induce in tachometer winding 25 an alternating current of the same frequency and of amplitude proportional to that applied to coil 12a. The phase of the voltage induced in winding 25 will be displaced, more particularly will be somewhat leading as compared with the voltage applied to coil 12a. Accordingly, the capacitor 28 and the resistors 26 and 27 are provided with values such that there is produced across resistor 27 an alternating-current potential difference which is in phase with that induced in the tachometer winding 25. In this connection, it is to be noted that the end of winding 25 which is connected to the connecting point or juncture between resistors 26 and 27 is in phase with the potential of that connecting point; that is to say, that the conductor 31 has zero potential as compared with conductor 24 for all amplitudes of alternating-current voltage applied to coil 12a. Accordingly, there will be no voltage in conductor 31 due solely to the energization of the control winding.

It is to be further noted that the power winding 11 is connected to the source of supply for relatively constant energization of that winding. Accordingly, since the energization of winding 11 is relatively constant, the voltage induced in tachometer winding 25 will vary in magnitude in accordance with the speed of rotation. More particularly, when the rotor 10a rotates, there is induced an alternating-current voltage in tachometer winding 25 having an amplitude proportional to the electromagnetic flux produced by the power winding 11, a phase dependent on the direction of rotation and proportional to the speed of rotation of the rotor 10a. Since the magnetic flux, produced by the power winding 11 is of relatively constant magnitude, the voltage induced in tachometer winding 25 varies only with speed of rotation. In the foregoing, it has been assumed that the compensating network 26—28 has functioned to eliminate from the voltage induced in tachometer winding 25 that due to the transformer action from control winding 12.

From the foregoing, it will be seen that there is at all times available and applied to the input of amplifier 16 a damping voltage from servo-motor 10 proportional in amplitude to the speed of rotation.

It is to be observed that if the ratio of the transformer made up of windings 12a and 25 does not have the same frequency characteristic as the compensating network or potential divider 26—28, there will be applied to the input of amplifier 16 an input signal of amplitude corresponding with the mis-match of said frequency characteristics. Such an input signal can give rise to a torque on the rotor causing it to tend to swing first in one direction and then the other. This hunting or oscillation is avoided by the connection and the selection of values of the compensating network to provide the same frequency characteristics for the compensating network as are present in the transformer formed by windings 12a and 25. The foregoing adjustment also compensates for the presence of a total amplification in the system including the transformer formed by windings 12a and 25, by compensating network 26—28, and the amplifier 16 which may be larger than unity. For compensation for a plurality of frequencies, the compensating network may be provided with a larger number of coupling elements, at least two for each frequency for which compensation is desired. It is also possible to utilize a narrow band width for the amplifier to decrease hunting or oscillation of the rotor about the balance point. With the above discussion, those skilled in the art will understand how to select the proper values for the compensating network which has, in practice, been found to be effective in manner described above.

In the foregoing explanation, it has been assumed that the power winding 11 has produced in the stator of motor 10 a magnetic flux of constant magnitude. Since the rotor 10a, through a mechanical connection like that illustrated at 20, may be utilized to drive a suitable mechanical load, the magnetic flux from power winding 11 will vary with load. The above assumption of substantial constancy of magnetic flux due to the power winding 11 is justified for the reason that I have found that the variation in the amplitude of the output voltage from tachometer winding 25 is rather small, so small that the change in amplitude due to the mechanical load on the rotor may be neglected.

More particularly, and as shown by FIG. 2, it will be seen that there is but a slight variation as between the curves 35 and 36, respectively plotted with voltage as ordinates and speed as abscissae. The curve 35 is for no-load operation of the motor 10, while the curve 36 is for a load of 30% of the stall-torque of motor 10. These curves show that the proportionality between voltage output of tachometer winding 25 with change in speed of the motor under widely varying load conditions is quite adequate for the purposes of the present invention; that is, to provide the damping voltage for the motor. The proportionality is adequate so that an alternating-current voltmeter connected between conductors 24 and 31 may be utilized for measuring the speed of rotation of motor 10 when high precision or great accuracy is not required.

Referring now to FIG. 3, which is a fractional part of FIG. 1, there has been illustrated the rotor 10a and the coil 12a forming a part of the control winding 12. The primary winding of a transformer 37 is connected across the coil 12a, while the secondary winding is connected through a compensating network 26—28 in series-circuit relation with tachometer winding 25. A fractional part of the voltage of the secondary winding of transformer 37, equal in magnitude to that developed by winding 25 due to the transformer action between it and winding 12a, opposes the voltage induced into winding 25 so that in the absence of rotation of rotor 10a, there is zero output voltage at output terminals 31a and 31b. These terminals are connected to the feedback circuit for applying the generated damping voltage to the input of the amplifier 16 of FIG. 1. By utilizing the transformer 37, there is achieved greater flexibility in the magnitude of the voltage which can be applied to the coupling network. While this network has been illustrated the same as the network of FIG. 1, by reason of the additional flexibility provided by transformer 37, it is to be understood that the compensating network may include a multiplicity of circuit components including resistors, capacitors and inductors in order to meet all of the above requirements including the elimination of hunting or oscillation of rotor 10a about the balance point of the measuring circuit including detector 15.

It is to be understood the invention is not limited to the embodiments described above. On the contrary, the present invention includes all modifications falling within the scope of the appended claims.

What is claimed is:

1. An induction motor adapted for use as a servomotor comprising a rotor of the squirrel-cage type, a two-phase stator, one of its two windings being a power winding and the other being a control winding, a tachometer winding disposed on said stator with the turns of said tachometer winding disposed in space on said stator electrically and mechanically corresponding with at least a part of the turns of said control winding, coupling means between said tachometer winding and at least a part of said control winding, an output circuit including said tachometer winding and said coupling means, said coupling means comprising circuit components for compensating in said output circuit for the voltage induced in said tachometer winding solely by the transformer action between said tachometer winding and said control winding and for correcting any difference in phase relation between the voltage introduced by said coupling means and that induced into said tachometer winding by said transformer action whereby there is developed at said output circuit a voltage of amplitude approximately proportional to the speed of rotation of said rotor.

2. The induction motor of claim 1 in which said circuit components of said coupling means includes resistors forming a potential divider and reactive means for correction of said phase relation.

3. The induction motor of claim 1 in which said circuit components of said coupling means includes in series-circuit relation in shunt with said turns of said control winding a capacitor and resistors forming a potential divider.

4. In a servo system the combination of an induction motor of the squirrel-cage type, a two-phase stator, one of its two windings being a power winding and the other being a control winding, a tachometer winding disposed on said stator with the turns of said tachometer winding disposed in space on said stator electrically and mechanically corresponding with at least a part of the turns of said control winding, coupling means between said tachometer winding and at least a part of said control winding, an output circuit including said tachometer winding and said coupling means, said coupling means comprising circuit components for compensating in said output circuit for the voltage induced in said tachometer winding solely by the transformer action between said tachometer winding and said control winding and for correcting any difference in phase relation between the voltage introduced by said coupling means and that induced into said tachometer winding by said transformer action whereby there is developed at said output circuit a voltage of amplitude approximately proportional to the speed of rotation of the rotor, supply means for said power winding and said control winding for energizing them with alternating current of the same frequency, said energizing means including in circuit with said control winding an alternating current amplifier, and means for applying to the input of said alternating current amplifier said voltage developed in said output circuit for introducing a damping action on said motor proportional to the speed of its rotation.

5. The servo system of claim 4 in which said circuit components of said coupling means includes resistors forming a potential divider and reactive means for correction of said phase relation.

6. The servo system of claim 4 in which said circuit components of said coupling means includes in series-circuit relation in shunt with said turns of said control winding a capacitor and resistors forming a potential divider.

7. The servo system of claim 4 in which said coupling means includes a transformer having its primary winding energized in parallel with at least a part of said control winding and the secondary winding of which transformer is connected in series-circuit relation with said tachometer winding, said output circuit being connected to said secondary winding and said tachometer winding through circuit elements respectively forming a voltage divider and for correcting said phase relation.

8. The servo system of claim 7 in which said control winding is made up of two coils, switching means for connecting said coils in series or in parallel, said tachometer winding being disposed in the same slots as one of said coils.

References Cited in the file of this patent

UNITED STATES PATENTS

| | | |
|---|---|---|
| 2,429,257 | Bond | Oct. 12, 1947 |
| 2,692,358 | Wild | Oct. 19, 1954 |
| 2,802,160 | Engeler | Aug. 6, 1957 |
| 2,810,874 | Faymoreau | Oct. 22, 1957 |
| 2,812,485 | Shieber | Nov. 5, 1957 |